Patented Mar. 17, 1953

2,631,938

UNITED STATES PATENT OFFICE 2,631,938

PROCESS OF COATING NUTS AND THE RESULTING PRODUCT

Jackson C. Miers, Concord, and Harry S. Owens, Berkeley, Calif., assignors to the United States of America as represented by the Secretary of Agriculture No Drawing. Application January 23, 1952, Serial No. 267,904

5 Claims. (Cl. 99—166)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the coating of nuts with a film of a calcium low-methoxyl pectinate (or pectate) which contains as integral components, agents to retard rancidification of the oil present in the nuts. The coated nuts in accordance with this invention can be kept for long periods of time without developing rancidity. In addition, the products have a very favorable smooth and glossy appearance, are free from greasiness, and the salt which may be made an integral part of the film provides uniform flavor for the nuts despite repeated handling of the the products.

In the usual method for preparing nuts for the market, the shelled nuts are first roasted either dry or in oil. The roasted nuts are then coated with an edible oil and then dusted with salt. The resulting product has several disadvantages. In the first place the coating of oil required to hold the salt makes the product greasy so that the consumer's fingers become greasy and articles in contact with the nuts become stained. Then too the oil coating does not hold the salt securely whereby upon handling the salt tends to settle to the bottom of the package, thus the nuts at the top have too little salt and the ones on the bottom have too much.

It has been proposed to coat nuts with a calcium low-methoxyl pectinate (or pectate) film containing salt in order to eliminate the above disadvantages. The products so produced are completely free from greasiness and since the salt is an integral part of the film, the proportion of salt on each nut is uniform and stays that way despite repeated handling.

However, the above type of coating brings up a new problem in that the nuts become rancid more rapidly than when given the usual oiling and salting treatment. Thus for example, a sample of roasted almonds when coated with calcium low-methoxyl pectinate containing salt had a shelf-life of about 28 days at 25° C. whereas oiled and salted nuts from the same lot stored at 25° C. had a shelf-life of 126 days.

We have now found that the problem of short shelf-life with pectinate or pectate coated nuts can be solved by incorporating with the film as integral components (1) an alkylated hydroxyanisole and (2) ethylene diamine tetra-acetic acid or the salts thereof. By addition of these agents, the development of rancidity is greatly retarded whereby the so-coated products retain their natural flavor for long periods of time, at least as long or longer than ordinary oiled and salted nuts. It is to be emphasized that addition of both the above agents is necessary as together the agents exhibit a synergistic effect, thus the two agents co-act to produce an effect which is not obtained by either alone. This fact is clearly demonstrated in the examples below. Another point to be emphasized is that the alkylated hydroxy anisole cannot be suitably replaced by other antioxidants. Thus we have found that many well known and otherwise effective antioxidants such as propyl gallate, lauryl gallate, nordihydroguaiaretic acid, 8-hydroxyquinoline, thiodipropionic acid, etc., do not give comparable results when used in place of the alkylated hydroxy anisole but yield products which develop rancidity very quickly and thus offer little improvement over nuts coated with calcium pectinate with no antioxidant at all.

The following examples demonstrate the invention in greater detail. Parts A and B of Example I represent procedures in accordance with this invention. Parts B to F of Example I represent experiments outside the scope of the invention, the experiments being included for comparative purposes.

Example I

A. Shelled, roasted almonds were dipped into an aqueous coating solution containing 3% sodium pectinate (methoxyl content 3%), 0.25% Ponceau 3R (a red certified food coloring), 1.2% glycerol, and 0.5% each (based on weight of the pectinate) of tertiarybutylated hydroxy anisole and the tetra sodium salt of ethylene diamine tetra acetic acid. The nuts were allowed to stay in the coating solution a few seconds then removed and immersed in a hardening bath containing water, 1.5% calcium chloride, 2% glycerol, 10% salt, and 0.015% each of tertiary-butylated hydroxy anisole and tetra sodium salt of ethylene diamine tetra acetic acid. The above agents were present in the hardening solution to prevent leaching of these agents from the film. The nuts were agitated in the hardening solution for several seconds then removed, drained, and dried at 95° C.

B. The procedure of part A was repeated except in this case the coating solution contained 1% each of tertiary-butylated hydroxy anisole and tetra sodium salt of ethylene diamine tetra acetic acid. The hardening bath also contained these agents in a proportion of 0.03% to prevent leaching of the agents from the formed film.

C. The procedure of part A was repeated except that in this instance neither tertiary butylated hydroxy anisole nor tetra sodium salt of ethylene diamine tetra acetic acid was used. This experiment was thus designed to show the effect of the calcium pectinate film without the protective agents.

D. The procedure of part A was repeated except that tertiary butylated hydroxy anisole was the sole protective agent. It was used in a concentration of 1% based on weight of the pectinate in the coating bath and in a proportion of 0.03% in the hardening bath to prevent leaching.

E. The procedure of part A was repeated except that tetra sodium salt of ethylene diamine tetra acetic acid was the sole protective agent. It was employed in a concentration of 1% based on the weight of the pectinate in the coating bath and 0.03% in the hardening bath to prevent leaching.

F. Some of the roasted almonds were coated with edible oil and dusted with 2% salt.

Samples of the above products were stored at various temperatures and the products tasted from time to time to determine their flavor and thus to determine their shelf life, that is, the length of time which the products could be stored without developing detectable rancidity.

The results are tabulated below:

| Expt. | Sample description | Shelf life in days at— | |
|---|---|---|---|
| | | 25° C. | 38° C. |
| A | Pectinate coated plus 0.5% each of tertiarybutylated hydroxy anisole and tetra sodium salt of ethylene diamine tetra acetic acid. | 133 | 33 |
| B | Pectinate coated plus 1% each of tertiarybutylated hydroxy anisole and tetra sodium salt of ethylene diamine tetra acetic acid. | 196 | 51 |
| C | Pectinate coated—no protective agent. | 28 | 6 |
| D | Pectinate coated plus 1% tertiary butylated hydroxy anisole. | 98 | 21 |
| E | Pectinate coated plus 1% tetra sodium salt of ethylene diamine tetra acetic acid. | 63 | 12 |
| F | Oiled, salted | 126 | 42 |

*Example II*

Broken almond nut meats were dipped in an aqueous solution containing 3% of sodium pectinate (methoxyl content 3%), 1.2% glycerol, 0.05% brown food dye, 0.01 sorbitan monolaurate, 0.015% tetra sodium salt of ethylene diamine tetra acetic acid, 0.015% tertiarybutylated hydroxyanisole. The pH of this solution was 4.5. After two seconds of draining, the pieces were dropped into an aqueous solution containing 2.5% calcium chloride, 12.5% salt, and 2% glycerol where they remained wth gentle agitation. The products were then drained and dried at 95° C. The coated products were noted to have a much more attractive appearance than the original material and they had excellent flavor which was retained after storage for 5 months at room temperature.

The technique of this invention may be applied to various nuts such as almonds, peanuts, cashews, filberts, walnuts, Brazil nuts, and so forth. The coating is preferably applied by a two-step procedure which involves first coating the nuts with an aqueous solution of an alkali low-methoxyl pectinate or pectate, that is, a solution containing a normal or acid salt of an alkali metal or ammonium with a low-methoxyl pectinic acid or pectic acid. This solution is usually applied to the food unit by dipping but it can also be applied by spraying or other conventional coating procedure. The concentration of pectinate or pectate in the coating liquid is not critical. In general the higher concentrations are generally more viscous; hence, form thicker films. A suitable range of concentration is from about 1% to about 5%, usually about 2–3.5%. The pH of the pectinate or pectate solution generally should be within the range of about 4.0 to 6.0. At this pH range, the pectinate or pectate is stable and no degradation will occur if the solution is allowed to stand. Further, at this pH the solution has a viscosity suitable for forming the pectinate or pectate coatings. Commercial low-methoxyl pectinates or pectates are partially neutralized low-methoxyl pectinic acids or pectic acids and their solutions naturally are of pH within the above stated range. If desired, the pH of the coating solution may be adjusted more precisely within this range by addition, with vigorous agitation, of hydrochloric or citric acid to lower it or sodium hydroxide to raise it. The films produced in accordance with this invention are basically composed of salts of low-methoxyl pectinic acids or pectic acid with calcium. These calcium salts may also contain some alkali cations, that is, cations of an alkali metal or ammonium.

As well known in the art, pectin or pectin source materials may be subjected to de-methoxylation by anzymic, acid, or alkaline processes. In cases where the de-methoxylation is essentially complete the product is pectic acid whereas if the de-methoxylation is partial, and the product has an ester methoxyl content of about 1 to about 7%, it is a low-methoxyl pectinic acid. Although one can use any one of the low-methoxyl pectinic acids containing from about 1% to about 7% methoxyl in our process, we prefer to use those pectinic acids containing about 3% to about 7% methoxyl. In the case of low-methoxyl pectinic acids produced by enzymic de-methoxylation, we prefer to use those having a methoxyl content about from 3.0 to 7% whereas in the case of pectinic acids produced by acid or alkaline de-methoxylation, we prefer to use those having a methoxyl content about from 3.0 to 4%.

After having formed a liquid coating of the pectinate or pectate, the nuts, while the coating is still wet, are contacted with a solution of a calcium salt. By this means, a metathesis occurs whereby the alkali ions are at least partly replaced by calcium ions and the alkali pectinate or pectate is converted into a calcium-alkali pectinate, a calcium-alkali pectate, a calcium pectinate, or a calcium pectate. As a result, the liquid coating on the food unit is converted into a gel coating which completely envelopes the nuts. At the same time, the food units are rendered non-coherent because the gel coating is smooth and slippery hence the gel coated nuts exhibit no tendency to cohere to one another. As the calcium salt one can use any non-toxic, soluble, ionizable, calcium salt. Although we prefer to use calcium chloride one may also use calcium acetate, monocalcium phosphate, and so forth. The anion to which the calcium ion is attached is essentially unimportant as the primary desideratum is to provide calcium ions. The concentration of the calcium salt is not critical within wide limits. Usually a concentration from about 1% to about 3% is employed. The calcium solution is generally applied by dipping the pectinate or pectate coated food unit into the calcium solution. If desired, however, the calcium solution can be applied by spraying or other conventional means. In general, the degree of replacement of alkali ions by calcium ions depends on the time of contact with the calcium bath. Thus to form a calcium-alkali pectinate or calcium-alkali pectate film the time of contact with the calcium solution is limited to not more than about 1 minute, preferably 10 to 30 seconds. If the time of contact is extended, further replacement of alkali ions will occur eventually to give a calcium pectinate or calcium pectate film. Essentially complete replacement of the alkali ions requires a time of contact of from about 2 to about 5 minutes. In general we prefer to limit the time of contact to get only partial replacement of the alkali ions, the point being that the calcium-alkali pectinate or calcium-alkali pectate films are tender and especially suited to the coating of foods which are to be eaten raw.

After the nuts have been contacted with the calcium solution, the nuts are then dried in air. Usually it is most convenient to place the coated nuts on a screen and subject them to a current of air until dry whereby the gel coating is converted into a true, self-sustaining film. Usually the air is applied at a temperature above room temperature, say about 50–100° C. to cause rapid drying. The films so produced are tender and edible thus they can be eaten right with the food itself. They are odorless and have a salty taste which contributes to the desired taste for nuts. Further, the films are glossy, smooth, and dirt-resisting, and resistant to the action of bacteria. The films enhance the appearance of the nuts and especially where broken grades of nuts are used, the film rounds off the broken edges and makes a very attractive product.

In addition to the pectinate or pectate, the coating solution should also contain the protective agents (1) an alkylated hydroxy anisole, such as methylated-, propylated-, amylated-, or butylated-hydroxy anisole and (2) ethylene diamine tetra acetic acid or its salts. These agents are incorporated in the coating solution in the proportion for each of about 0.5 to 1%, based on the weight of pectinate or pectate. In addition, to prevent leaching from the film, the hardening bath should contain a small proportion (about 0.01 to 0.1%) of these agents.

It is usually advisable to include a water-soluble plasticizer in the coating liquid thus to form a more flexible film. For this purpose one may use, for example, glycerol, glycol, ethylene glycol monoethyl ether, sucrose, glucose, gum arabic, etc. In general, the proportion of plasticizer should not be more than about 40% based on the amount of pectinate or pectate. Generally, where a plasticizer is used, it is preferable to also incorporate the same plasticizer in the hardening solution thus to prevent leaching of the plasticizer from the coating.

If desired, additional film-forming ingredients may be incorporated in the alkali pectinate or pectate solution. Suitable blending agents are, for example, methyl cellulose, ethyl cellulose, carboxymethyl cellulose or its alkali metal or ammonium salts. These water-soluble, cellulosic, blending agents in some cases increase the adherence of the film to the food unit and also often increase the flexibility of the film. The proportion of added blending ingredient is not critical and we have obtained films desirable for food-packaging purposes from the pectinate or pectate solutions containing up to 67% of the blending agent based on the total amount of polysaccharide (cellulosic material plus pectinate or pectate) in the solution.

Various other materials may be incorporated in the pectinate or pectate solution or they may be incorporated in the calcium solution to give the finished film coating any desired characteristic. For example, one may incorporate dyes or pigments in either solution to form a colored film. For example, a red film may be obtained by incorporating a small amount of F. D. & C. Red # 1 in the initial coating solution. Mold-inhibiting agents may be added to the pectinate or pectate solution to give the film greater protective value. For example, about 0.1% of ethyl parahydroxybenzoate may be incorporated in the solution to give the film mold-inhibiting properties. Other agents of this type which may be used are, for example, methyl parahydroxybenzoate, sodium parahydroxybenzoate, sodium benzoate, ethyl vanillate, and so forth. Flavoring agents may be added to either solution thus to give the film a distinct odor and/or taste. For giving the nuts the proper saltiness, the hardening bath should contain about 10–15% of salt so that the coated nuts will contain about 1 to 2% salt. Vitamins or other nutrients may be incorporated in the coating solution to increase the food value of the final product.

It is often advantageous to add a small proportion of a surface active agent to the pectinate (or pectate) solution so that this solution will wet the surface of the nuts and thus form an adherent, uniform, liquid film thereon. Many different surface active agents may be used for this purpose such as alkyl ($C_8$–$C_{18}$) sulphates, for example, sodium lauryl sulphate; the mono or dialkyl ($C_6$–$C_{18}$) esters of sulphosuccinic acid, for example, sodium di(2-ethylhexyl) sulphosuccinate; the alkyl ($C_3$–$C_{22}$)-aryl sulphonates, for example, sodium dodecyl benzene sulphonate; soluble soaps, for example, sodium laurate; sulphonated or sulphated amides, such as the sodium salt of N-sulphoethyl stearamide; partial esters of polyhydric alcohols such as glycerol, glycol, polyglycerols, polyglycols, sorbitol, mannitol, pentaerythritol with the higher fatty acids, sorbitan monolaurate, for example. In general we prefer to use the latter type of compound (partial esters of polyhydric alcohols) as they decrease surface tension without causing stable foams—this decreases the possibility of forming voids in the finished film. In general only a small concentration of the wetting agent is required, i. e., from about 0.01 to about 0.1%. In any particular case, the proper concentration for any particular agent can easily be determined by adding small proportions thereof to the pectinate bath and noting the amount required so that the pectinate solution will form a complete, even liquid layer about the food to be coated.

Instead of forming the film coating by the above described two-step process, it may be formed by the one-step technique disclosed by Owens and Schultz in U. S. Patent No. 2,517,595. This technique involves dipping the nuts in a dispersion of a calcium-alkali pectinate and then drying the coated product. In this technique a solution is first prepared containing about 1 to 8% of a water-soluble low-methoxyl pectinate. This solution is then warmed and to it is added a non-toxic calcium salt in such amount that the gelation temperature of the resulting dispersion is about 40°–75° C. In general about 0.003 to about 0.07 part of calcium will be required per part of pectinate. This dispersion which should be at pH 4-6 is used at a temperature of 50° C. to 80° C. to keep it liquid. To this dispersion are added the protective agents, an alkylated hydroxy anisole and ethylene diamine tetra acetic acid or the salts thereof. Each of these agents is added in a concentration of 0.5 to 1% based on pectinate. In addition one may add to the dispersion any of the additional materials above described, for example, water-soluble plasticizer, additional film-forming material, wetting-agents, dyes, mold-inhibiting agents, nutrients, flavorings, etc. After dipping the nuts into the dispersion they are dried in a current of warm air. If desired, the coated nuts may be immersed in a solution of a non-toxic calcium salt prior to drying to assist in hardening the coating.

Having thus defined our invention, we claim:

1. The process which comprises encasing nuts with an edible film of the class consisting of calcium low-methoxyl pectinates and calcium pectates, said film containing as integral components an alkylated hydroxy anisole and a member of the class consisting of ethylene diamine tetra acetic acid and the salts thereof.

2. The process which comprises encasing nuts with an edible calcium low-methoxyl pectinate film containing as integral components butylated hydroxy anisole and the tetra sodium salt of ethylene diamine tetra acetic acid.

3. A stabilized nut product comprising nut meats encased in an edible film envelope of the class consisting of calcium low-methoxyl pectinates and calcium pectates, said film containing as integral components an alkylated hydroxy anisole and a member of the class consisting of ethylene diamine tetra-acetic acid and the salts thereof.

4. A stabilized nut product comprising nut meats encased in an edible film envelope of a calcium low-methoxyl pectinate, said film containing as integral components butylated hydroxy anisole and the tetra sodium salt of ethylene diamine tetra acetic acid.

5. A stabilized nut product comprising nut meats encased in an edible film envelope of a calcium low-methoxyl pectinate, said film containing as integral components: salt; tertiarybutylated hydroxy anisole in a proportion of about 0.5% to about 1% based on the amount of pectinate; and the tetra sodium salt of ethylene diamine tetra acetic acid in a proportion of about 0.5% to about 1% based on the amount of pectinate.

JACKSON C. MIERS.
HARRY S. OWENS.

REFERENCES CITED

The following references are of record in the file of this patent:

UNITED STATES PATENTS

| Number | Name | Date |
| --- | --- | --- |
| 2,517,595 | Owens et al. | Aug. 8, 1950 |